United States Patent [19]
Largura

[11] Patent Number: 5,969,788
[45] Date of Patent: Oct. 19, 1999

[54] HAIR RESTRAINT FOR EYEWEAR

[76] Inventor: Robert P. Largura, P.O. Box 50421, Santa Barbara, Calif. 93150

[21] Appl. No.: 09/128,571

[22] Filed: Aug. 3, 1998

[51] Int. Cl.⁶ .................................................. G02C 5/14
[52] U.S. Cl. ........................................ 351/158; 351/123
[58] Field of Search ................................ 351/123, 122, 351/111, 121, 158, 41; 24/3.3

[56] References Cited

U.S. PATENT DOCUMENTS

| | | |
|---|---|---|
| 1,898,059 | 2/1933 | McDonald . |
| 2,766,657 | 10/1956 | Nathan . |
| 3,210,814 | 10/1965 | Wolf . |
| 3,552,839 | 1/1971 | Manning . |
| 3,709,228 | 1/1973 | Barker . |
| 3,709,234 | 1/1973 | Seerahn . |
| 3,883,236 | 5/1975 | Zipper . |
| 4,548,484 | 10/1985 | Ehring . |
| 5,355,185 | 10/1994 | Lee . |
| 5,471,258 | 11/1995 | Hsieh . |
| 5,631,718 | 5/1997 | Markovitz et al. . |
| 5,664,291 | 9/1997 | Stoller ........................................ 351/123 |

*Primary Examiner*—Hung Xuan Dang
*Attorney, Agent, or Firm*—Leo F. Costello

[57] ABSTRACT

A hair restraint attachable to eyewear is provided so as to enable a person wearing long hair to maintain the hair in as natural a manner as possible while preventing the hair from falling forwardly when the person tilts his or her head forwardly and downwardly. The hair restraint provides a mounting bar releasably attachable to a temple of the eyewear and an arm that projects rearwardly and divergently from the temple to form a rearwardly opening notch that receives the long hair from the sides of the wearer's head and prevents such side hair from falling forwardly toward the front of the wearer's head particularly when the wearer's head is tilted forwardly and downwardly.

28 Claims, 4 Drawing Sheets

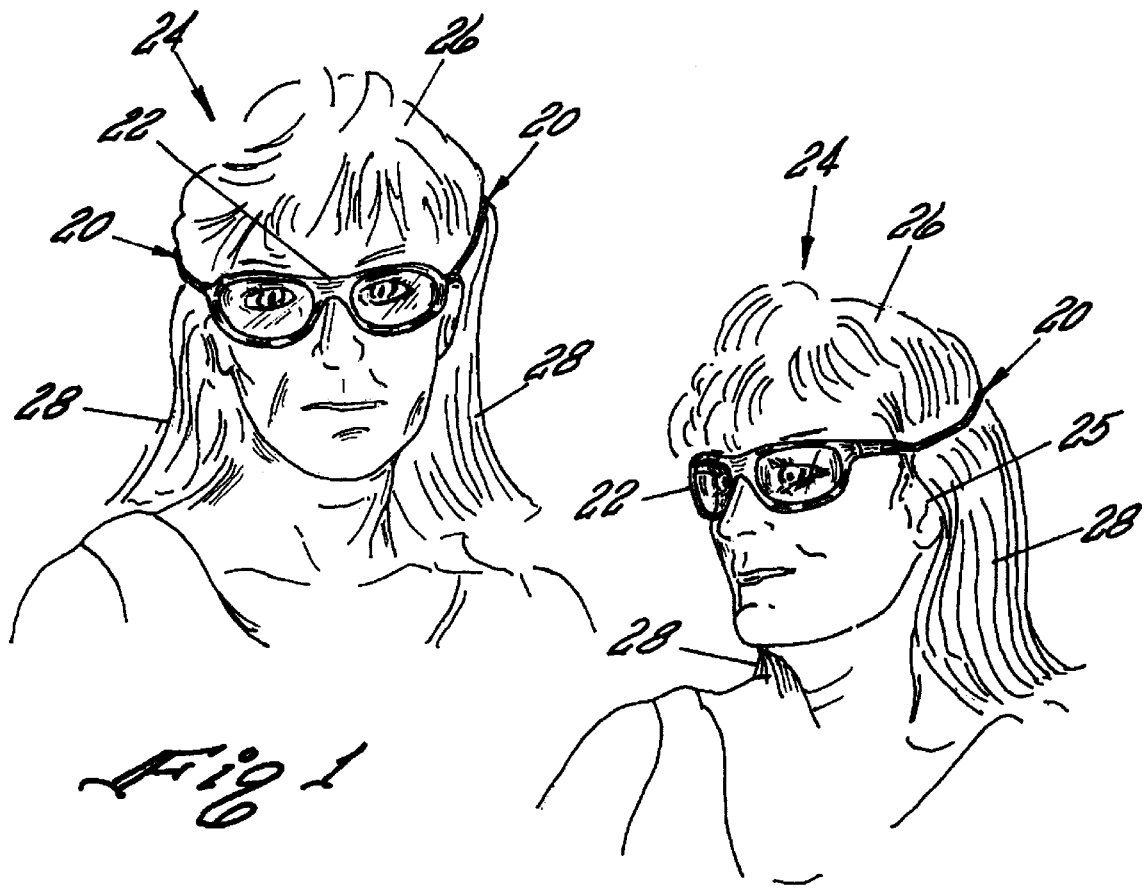
Fig 1
Fig 2
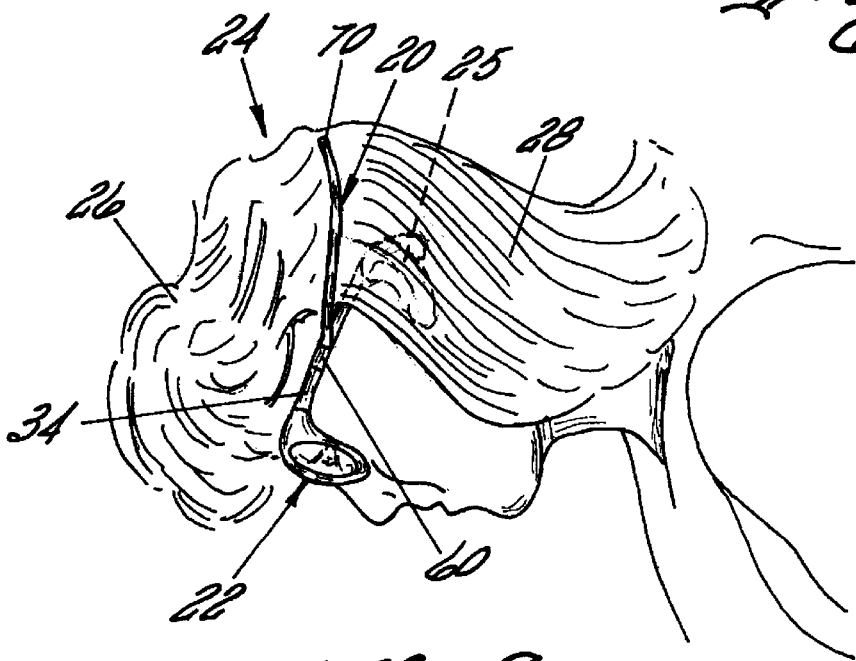
Fig 3

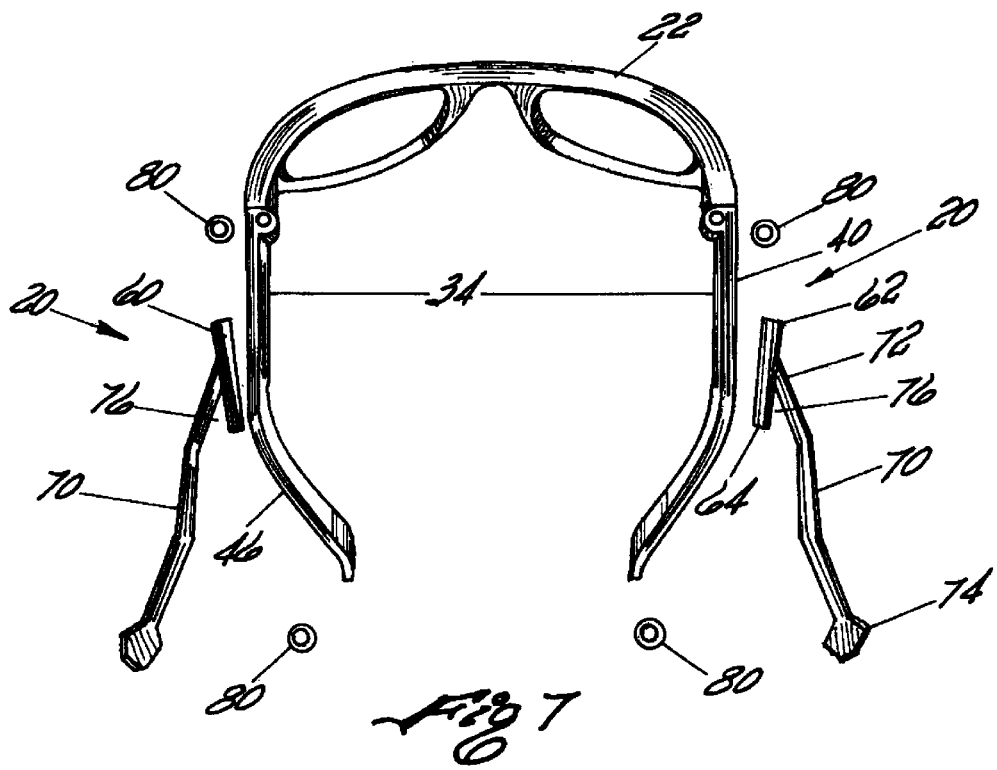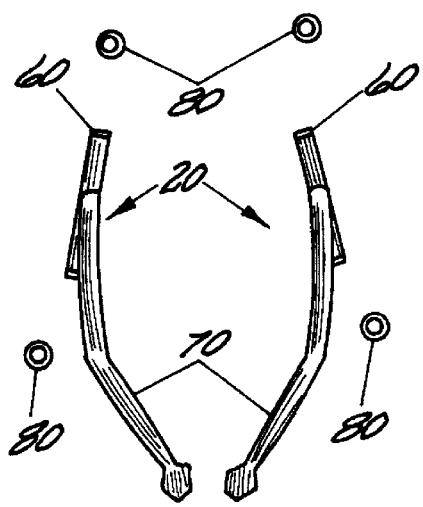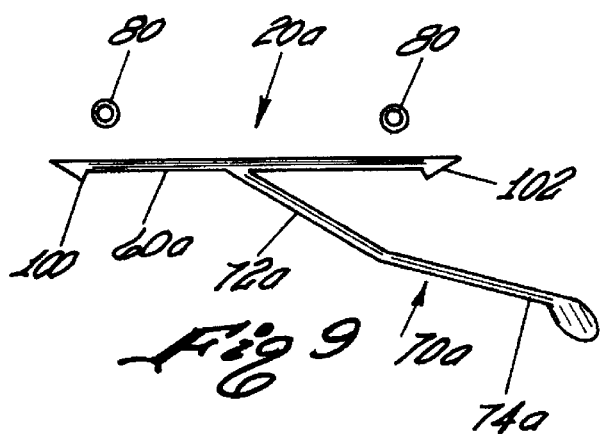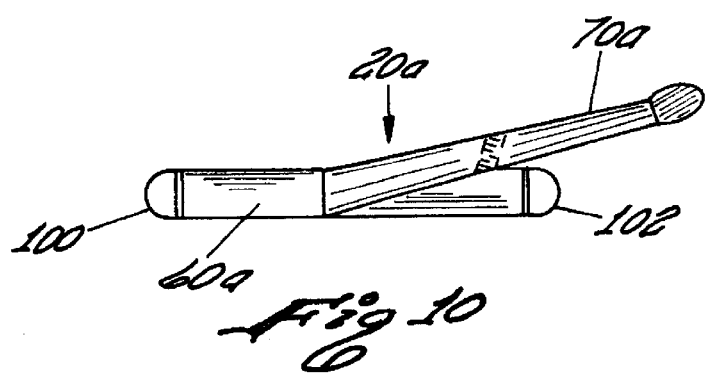

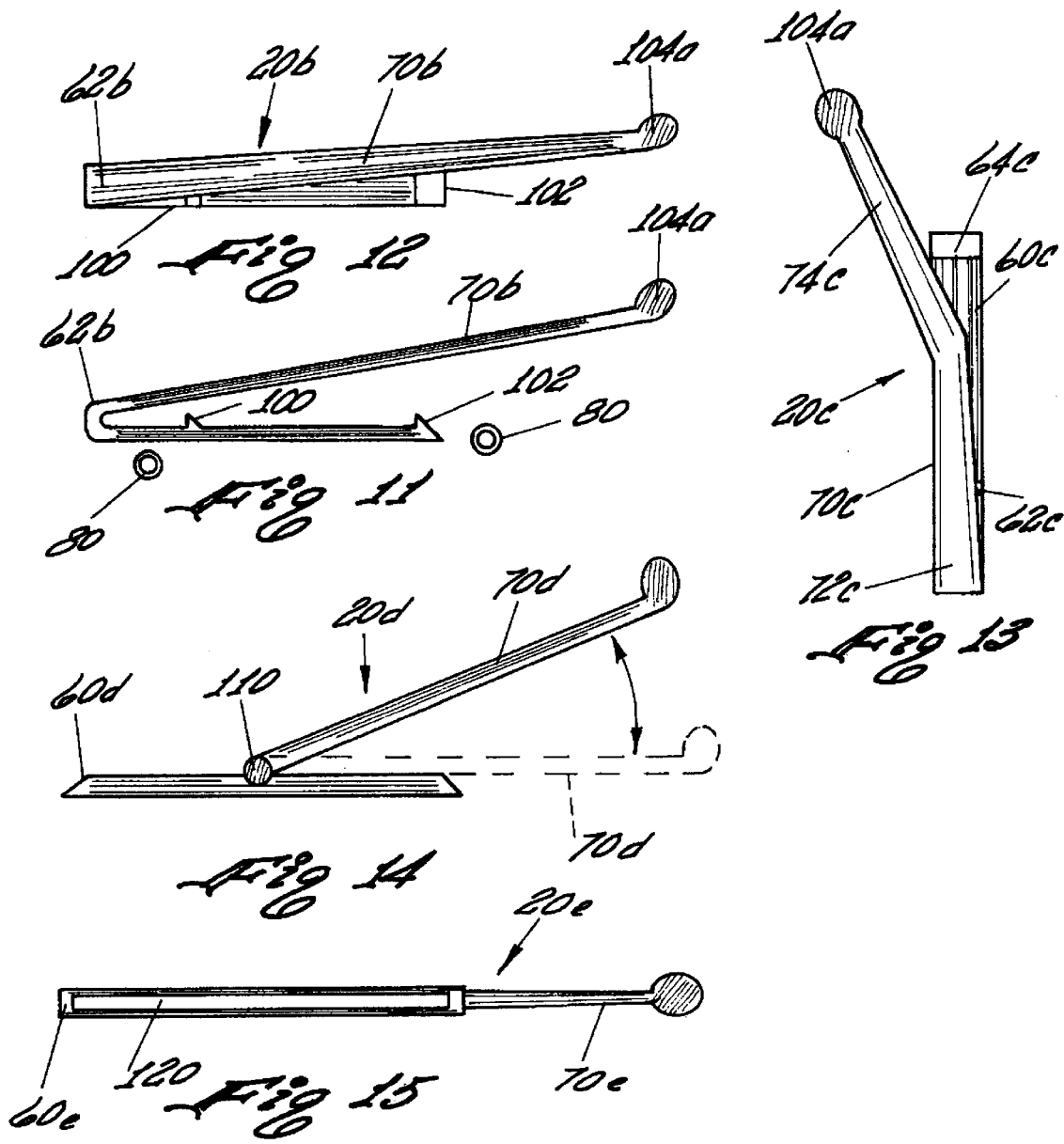

HAIR RESTRAINT FOR EYEWEAR

The present invention pertains to a hair restraint for eyewear and more particularly to an accessory for eyewear that restrains hair hanging downwardly from the sides of a person's head from falling forwardly when the person tilts his or her head downwardly and forwardly.

BACKGROUND

Wearing long hair is the custom for many people, both men and women. That is, the hair may be worn shoulder length, or even longer, whereby the hair hangs downwardly in long tresses from opposite sides of the person's head. Although a person may choose such a hair style, for fashion or other reasons, there are disadvantages to the hair hanging freely down, particularly at the sides of the head.

Each time a person with such long hair tilts his or her head forwardly and downwardly, the hair naturally falls forwardly in a sometimes annoying and perhaps an unsanitary or even a dangerous manner. For example, if while reading or studying, one thusly tilts the head, the side hair may fall onto the document being read, perhaps obscuring it or the reader's vision. Again, if the head is tilted forwardly while eating, the hair can fall onto the food. Even more significant for a person with who is operating equipment or machines, tilting of the head forwardly may cause falling hair to obscure the worker's vision or the hair may fall into the moving parts of the machine whereby it could be caught causing injury to the worker.

There are well known ways to hold long hair in place, but these are not always satisfactory. The hair can be worn in a ponytail or be fastened back with combs or a barrette, or a net or a scarf may be used. These devices, however, either change the natural shape of the hair or obscure it. Also, a comb or barrette may fall out of the hair and be lost.

Although not in common use, it is also known to provide a hair clip on eyeglasses, as disclosed in U.S. Pat. No. 5,471,258 to Hsieh. The Hsieh clip is incorporated in non-standard eyeglasses especially made for the clip and includes a pair of arms pivoted to the temples of the glasses for movement between retracted positions recessed into the temples and the rims and extended positions projecting upwardly from the temples. Combs are attached to the arms that are placed in the hair in the extended positions of the arms. With the Hsieh clip, the temples must be worn outside of the hair, i.e., the hair must be captured between the temples and the wearer's head by the temples. Accordingly, the shape of falling locks of hair at the sides of one's head is considerably changed, the ears are always exposed, and the hair may cause the temples to place uncomfortable leveraging-type pressure on the wearer's ears or may even disturb the normal mounted stability and security of the glasses on the wearer's head.

SUMMARY

A hair restraint attachable to eyewear is provided so as to enable a person wearing long hair to maintain the hair in as natural a manner as possible while preventing the hair from falling forwardly when the person tilts his or her head forwardly and downwardly. The hair restraint provides a mounting bar releasably attachable to a temple of the eyewear and an arm that projects rearwardly and divergently from the temple to form a rearwardly opening notch that receives the long hair from the side of the wearer's head and prevents such side locks from falling forwardly toward the front of the wearer's head, particularly when the wearer's head is tilted forwardly and downwardly.

An object of the present invention is to prevent long hair at the sides of a person's head from falling forwardly when the person tilts his or her head forwardly and downwardly.

Another object is to control the long hair at the sides of a person's head while allowing the hair to fall from the person's head in as natural a manner as possible.

A further object is to provide a hair restraint that is releasably attachable to eyewear for controlling long hair.

A still further object is to provide a hair restraint that can be releasably attached to standard eyewear and thus does not require that eyewear be modified in order to accommodate the hair restraint.

Yet another object is to enable a person to wear long hair without the inconvenience, annoyance, and possible danger associated with the hair at the sides of the head falling forwardly toward the person's face when the person tilts his or her head forwardly and downwardly.

A still further object is to provide a hair restraint that can be adjustably mounted on the temple of eyewear.

An additional object is to provide a hair restraint that can accommodate different thicknesses of hair to be restrained.

Yet another object is to provide a hair restraint that can be adjusted to allow long hair to be worn over the person's ears or to be held back so as to expose the person's ears, in accordance with the wearer's wishes.

It is also an object is to provide hair restraints that can be attached to standard eyewear so that the temples of the eyewear can be moved between wearing positions rearwardly extended from the lens rims or folded positions against the lens rims.

Another object is to provide a hair restraint that can be made in different colors and thereby serve as an attractive accessory in the hair of the wearer.

An added object is to provide a hair restraint that is simple and inexpensive to make by conventional molding techniques that includes a minimum of parts and is easy to attach and use.

A still further object is to provide a restraint that can be shaped to control different styles and thicknesses or amounts of long hair.

A further object is to provide alternative ways of attaching a hair restraint to the temple of eyewear, of enabling the restraint to be folded out of the way when not in use, and of safely securing the restraint on the temple.

These and other objects will become apparent upon reference to the following description and claims and to the accompanying drawings.

DESCRIPTION OF THE DRAWINGS

FIG. 1 is a front elevation of the head and shoulders of a person wearing eyeglasses to which the subject hair restraint is attached.

FIG. 2 is a view similar to FIG. 1 but showing the wearer's head turned slightly toward the right in order to show how the subject hair restraint looks while holding long side locks of hair in place.

FIG. 3 is a somewhat enlarged side elevation of the person's head and shoulders shown in FIGS. 1 and 2 with the head being tilted forwardly and downwardly and showing how the subject hair restraint prevents the long hair at the sides of the person's head from completely falling forwardly and downwardly along the sides of the head.

FIG. 7 is an exploded view of the eyeglasses and hair restraints separated from each other and with the O-rings of the hair restraints separated from their mounting bars.

FIG. 8 is an exploded view of a pair of hair restraints per se but rotated ninety degrees from the showing in FIG. 7.

FIG. 9 is a top plan view of an alternative embodiment of the subject hair restraint.

FIG. 10 is a side elevation of the hair restraint shown in FIG. 9.

FIG. 11 is a top plan view of a still further alternative embodiment of the subject hair restraint.

FIG. 12 is a side elevation of the hair restraint shown in FIG. 11.

FIG. 13 is a side elevation of a modification of the hair restraint shown in FIGS. 11 and 12.

FIG. 14 is a top plan view of a still further embodiment of the subject hair restraint.

FIG. 15 is a side elevation of yet another embodiment of the hair restraint of the present invention.

DETAILED DESCRIPTION

Figure 4:
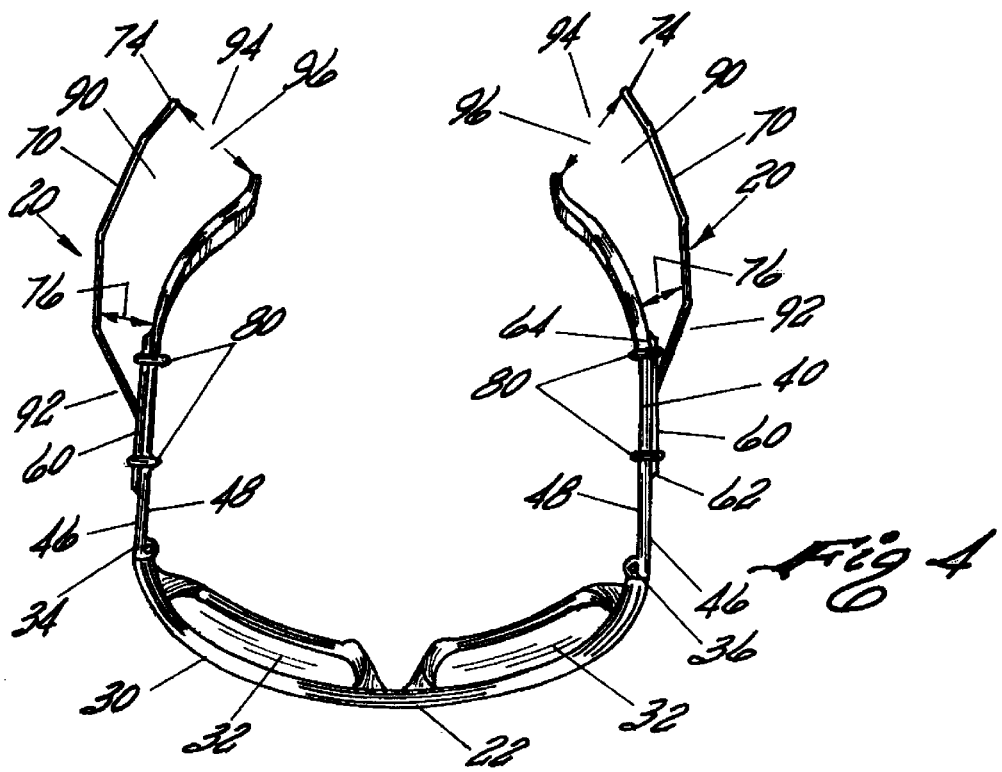
FIG. 4 is a top plan of a pair of eyeglasses with the subject hair restraints attached to the temples of the glasses, it being understood that the eyeglasses and the restraint are enlarged from FIGS. 1–3.
Figure 5:
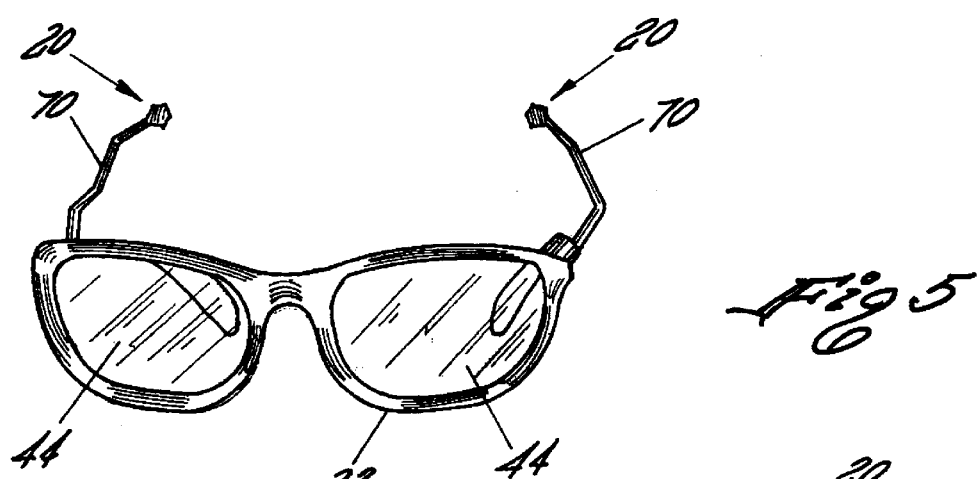
FIG. 5 is a front elevation of the eyeglasses and hair restraints shown in FIG. 4.
Figure 6:
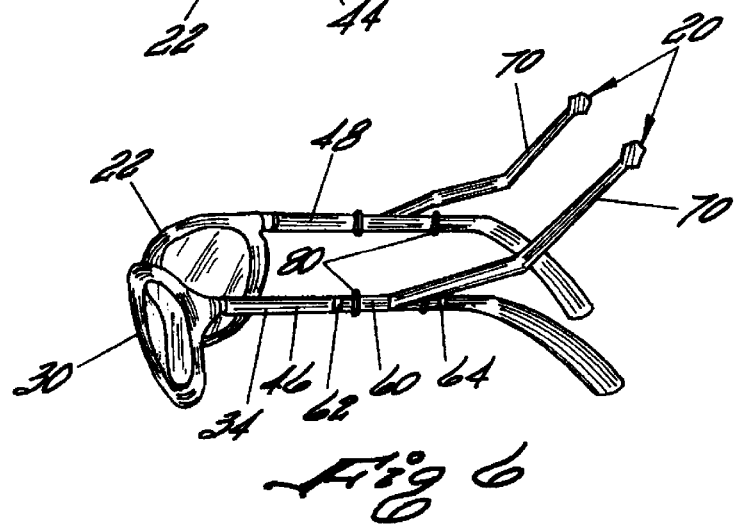
FIG. 6 is an isometric side view of the eyeglasses and hair restraints shown in FIGS. 4 and 5, although slightly reduced from FIGS. 4 and 5.

A hair restraint incorporating the principles of the present invention is generally indicated by the numeral 20 in the drawings. A pair of the hair restraints is shown in FIGS. 1, 2, and 3 mounted on eyeglasses 22 being worn by a person 24 having hair 26 with side portions or tresses 28 hanging down on opposite sides of the person's head. Although only one hair restraint is required to hold the hair at one side of the head, normally a pair of the restraints would be used to hold the hair back at each side of the wearer's head, as shown.

The eyeglasses 22 (FIGS. 1–7) to which the subject hair restraints 20 are adapted to be attached may be any standard pair of eyeglasses of which there are many styles, so the eyeglasses shown in the drawings are merely representative of such standard glasses, or eyewear more broadly, and do not limit the present invention, as will be fully understood as the description proceeds. Such eyewear has a pair of rims 30 in which lenses 32 are mounted and temples 34 hinged to the rims at 36 for movement between operable rearwardly extended positions shown in FIGS. 1–7 and in a well known manner and retracted positions folded against the lenses and rims, not shown but in a very well known manner. Although not common, it will be understood that all that is required to mount the subject hair restraint is the standard frame including at least one temple, whether or not lenses are fitted in the rims. For convenient reference, each temple has an upper edge 40, a front end 42, a rear end portion 44 curved to fit the ear of the wearer, an outer surface 46, and an inner surface 48.

The hair restraint 20 (FIGS. 4–8) includes an elongated mounting bar 60 preferably having a rectangular cross section and including front and rear end portions 62 and 64. The mounting bar has a length that is shorter than the length of a normal temple 34 measured from its hinge 36 to the bend at the rear end portion 44. In the preferred embodiment, the mounting bar is approximately one-half of the length of the temple or approximately three centimeters. The width of the mounting bar is similar to the width of the temple of a standard pair of eyeglasses 22 and thus in the preferred embodiment it is about four to five millimeters. The thickness of the mounting bar is less than its width and again is about the same thickness as the thickness of a standard temple, being in the preferred embodiment about one millimeter.

Each hair restraint 20 also includes an elongated restraining arm 70 (FIGS. 1–8) preferably having a rectangular cross section that is similar in dimensions to the cross section of the mounting bar 60. The restraining arm has front and rear end portions 72 and 74 and may either be angulated, arcuate, or straight. In the preferred embodiment of FIGS. 1–8, the restraining arm is angulated with the front end portion being in obtuse angular relationship with the rear end portion. Both of the mounting bar and restraining arm are preferably molded of a suitable thermoplastic material so that the bar and the arm are hard and relatively rigid although having a measure of resilient flexibility because of their relative thinness. The length of the restraining arm may vary but is longer than the mounting bar and shorter than the length of a standard temple 34 of a pair of eyeglasses 22. In the preferred embodiment, the length of each restraining arm is approximately six centimeters. The front end 72 of each restraining arm 70 (FIGS. 4–8) is secured to the mounting bar 60, preferably molded integrally therewith, intermediate the front and rear end portions 62 and 64, so that the arm first projects divergently rearwardly and upwardly from the mounting bar and thence projects upwardly and somewhat inwardly of the mounting bar. As attached to the mounting bar, the restraining arm can be resiliently flexed slightly outwardly relative to the mounting bar, although upon release of the flexing pressure, the restraining arm returns to the described divergent rearwardly upwardly extending relationship to the mounting bar. The angle 76 between the mounting bar and the front end portion 72 of the restraining arm, when the mounting bar and the restraining arm are in a relaxed, unstressed condition, is preferably from about fifteen to about thirty degrees, although the exact angle is not critical.

Still further, each hair restraint 20 (FIGS. 4–8) includes a pair of resiliently expandable front and rear O-rings 80, preferably of rubber. In the preferred embodiment, each O-ring when in relaxed condition has an outside diameter of about six millimeters and an inside diameter of about three millimeters. Each O-ring is sufficiently resiliently expandable so as to fit over the mounting bar 60 in resilient, circumscribing, constricting relation thereto. Each hair restraint has a pair of O-rings in such circumscribing relation to the front and rear end portion 62 and 64 of its respective mounting bar.

It will be understood that the specific dimensions given for the preferred embodiment are not critical and are provided solely to give a better understanding of the invention at least in its preferred embodiment.

As previously indicated, a pair of hair restraints 20 is provided for each pair of eyeglasses 22 with the hair restraints being individually mounted on the temples 34 of the eyeglasses. Referring to FIGS. 4 and 7, the front and rear O-rings 80 are first slipped over the front and rear end portions 62 and 64 of the mounting bars 60, where they remain when the restraints are not being used. When it is desired to attach the restraints to the eyeglasses, each mounting bar is placed along side its respective temple 34, and the front O-ring is slipped over the rear end portion 44 of its temple. Each mounting bar and front O-ring are slid forwardly along the temple until the rear O-ring is able to slip over and around the rear end portion of its temple. Thereafter, each mounting bar and its O-rings are slid forwardly on its temple until the mounting bar is positioned between its respective hinge 30 and the bend at the rear end portion of its temple, as shown in FIG. 4.

As such, each mounting bar 60 (FIG. 4) is held snugly against the outer surface 46 of its respective temple 34 by the O-rings 80, and the respective restraining arm 70 projects divergently rearwardly outwardly and upwardly relative to its respective temple and then somewhat inwardly relative to the temple. In this assembled condition, each restraining arm is in approximately the same angular relationship 76 with the front end portion 42 of the temple 34 as described above with relation to the mounting bar 60. However, each restraining arm may be flexed resiliently outwardly from its temple somewhat, both because of the resilient connection of the restraining arm to the mounting bar and because the resilient expandability of the O-rings allows such outward flexing. In either case, the resilience returns the restraining arm to the described angular relationship 76 upon release of the flexing pressure.

Irrespective of the specific dimensions and angular relationships mentioned above, what is significant in the assembled relationship between the hair restraints 20 and the eyeglasses 22 (FIG. 4) is that the restraining arms 70 and their respective temples 34 form rearwardly opening, hair receiving notches 90 that may be described as generally V-shaped or U-shaped or wishbone shaped. Thus, each notch has a closed front end 92 where the restraining arm 70 joins the mounting bar 60 and thus joins the respective temple 34, and a rear opening or mouth 94 defined between the rear end portion 74 of the restraining arm and the rear end portion 44 of the respective temple. Again, although specific dimensions are not critical to effective operation of the hair restraint, the transverse dimension 96 between the terminus of the rear end portion 74 of each restraining arm 70 and the rear end portion 44 of its respective temple is preferably about one and one-half centimeters.

In use (FIGS. 1–4), the eyeglasses 22 are fitted with the hair restraints 20 as described above and as best shown in FIG. 4. The wearer 24 (FIGS. 1–3) then puts the eyeglasses on with the temples 34 fitted against the wearer's head between the head and the wearer's long hair 28 and so that the rear end portion 44 of each temple 28 is over the wearer's ears 25 in the usual manner and as shown in dashed lines in FIG. 3. The long side portions or tresses 28 of hair at the sides of the wearer's head are placed in the notches 90 of the hair restraints so that the restraining arms 70 are outside of the hair and extend rearwardly upwardly from the temples, as best seen in FIGS. 1–3. Because of the resilient flexibility of the restraining arms 70, these arms may be flexed outwardly somewhat to allow the hair to fit neatly within the notches. It is to be understood, however, that one of the important purposes of the present invention is that the person can wear his or her hair more naturally than with other types of hair restraints. Thus, the restraining arms 70 do not tightly constrict or force the hair against the head but rather allow it to hang more freely and naturally from the scalp. As such, the subject hair restraints allow the hair to take its more natural shape.

Of greatest significance, however, and the prime objective of the invention, is the ability of each hair restraint 20 to control the hair 28 as the wearer 24 moves his or her head. Thus, as illustrated in FIG. 3, when the wearer tilts her head forwardly and downwardly, the restraining arms 70 hold the side portions 28 of hair from falling downwardly and forwardly over the sides of the wearer's cheeks and face. Depending on the length of the hair, the hair restraints will hold the hair back in various degrees. Even with the approximate shoulder length hair shown in FIGS. 1–3, the restraints prevent the hair portions 28 from falling down, just as shown in FIG. 3 which is a drawing based on a model wearing and demonstrating the effectiveness of the subject invention. In any event, when the restraining arms are fitted over the hair above and adjacent to the temples of the eyeglasses 22, as shown in FIG. 3, the bulk of the hair is held back. As a result, if the user is reading, these long side tresses 28 do not fall onto the reading material nor do they fall onto a plate if the person is eating. Furthermore, if the person is working with equipment, the person's hair does not fall down on each side of the head so as to obscure the person's vision nor does the hair fall into moving parts of the equipment being used.

Not only do the hair restraints 20 provide the restraining function described, the restraining arms 70 provide an attractive accessory in the hair. Thus, the hair restraints are preferably made in attractive colors and may also be provided with attractive designs or even with an appealing logo on the outside surfaces of the mounting bar 60 and restraining arm 70.

With reference to FIGS. 9–15, alternative embodiments of the subject hair restraints 20 are shown. In FIG. 9, the hair restraint 20a includes a mounting bar 60a having front and rear barbs 100 and 102 over which the O-rings 80 are fitted and serve to prevent the O-rings from slipping off the ends of the bar. Also, in this embodiment, the restraining arm 70a has straight front and rear portions 72a and 74a and has a rear enlarged terminus 104. FIG. 10 shows a side elevation of the hair restraint 20a.

FIG. 11 shows a hair restraint 20b that includes a mounting bar 60b having a rear barb 102a. This hair restraint has a straight restraining arm 70b that is attached to the front end 62b of the mounting bar and projects rearwardly and upwardly in a divergent manner from the mounting bar. FIG. 12 is a side elevation of the hair restraint shown in FIG. 11.

FIG. 13 shows another embodiment of the hair restraint 20c that is similar to the hair restraint 20b except that the restraining arm 70c has a front portion connected to the front end 62c of the mounting bar 60c and a rear portion 74c extending angularly upwardly and outwardly from the front portion 72c.

A still further embodiment of the hair restraint is identified by the reference numeral 20d in FIG. 14. This restraint includes a mounting bar 60d and a restraining arm 70d that is pivoted at 110 intermediate the front and rear end portions of the mounting bar for movement between a retracted position, as shown in dashed lines in FIG. 14, against the mounting bar and thus generally parallel to the temple 28 of the eyeglasses 22 and a position extending divergently rearwardly outwardly from the mounting bar as shown in full lines in FIG. 14.

Yet another embodiment of the subject hair restraint is identified by the reference numeral 20e in FIG. 15. In this case, the mounting bar 60e is attached to the temple 28 of a pair of eyeglasses 22 by double sided adhesive tape or other suitable adhering media indicated at 120. In addition, the mounting bar has an outwardly opening slot, not shown. The restraining arm 70e has a forward end captured in and slideably moveable in the slot so that the arm may be pivoted relative to the mounting bar and also slid lengthwise of the mounting bar and thus the temple of the eyeglasses.

Although preferred embodiments of the present invention have been shown and described, various modifications and substitutions may be made thereto without departing from the spirit and scope of the present invention. Accordingly, it is to be understood that the present invention has been described by way of illustration and not limitation.

What is claimed is:

1. An accessory for eyewear that has at least one temple adapted to fit against the side of a wearer's head between the head and the wearer's long hair, comprising:

hair restraining means, and means for attaching the hair restraining means to the temple of such eyewear so that a hair receiving notch is formed outwardly of the temple between the temple and the restraining means and so that the notch has a closed front end and a rear opening for receiving the wearer's long hair whereby the closed front end restrains the long hair from falling too far forwardly particularly incident to forward tilting of the wearer's head.

2. A hair restraint for eyewear having an eye portion adapted to fit in front of the eye of a wearer and a temple portion extending rearwardly from the eye portion so as to fit against the side of the wearer's head under long hair of the wearer comprising:

an elongated relatively rigid arms, and the arm being attached to the temple of such eyewear with the arm extending divergently outwardly from the temple and forming a rearwardly opening notch that receives the long hair of the user and prevents such long hair from falling too far forwardly and downwardly toward the front of the wearer's head, particularly when the wearer's head is tilted forwardly and downwardly.

3. A hair restraint for eyewear having an eye portion adapted to fit in front of the eye of a wearer and a temple portion extending rearwardly from the eye portion so as to fit against the side of the wearer's head under long hair of the wearer comprising:

a mounting member adapted to be attached to the temple portion of eyewear, an elongated arm having front and rear end portions, and the arm being fastened to the mounting member so that, when the attachment member is attached to said temple portion, at least a portion of the arm angles rearwardly and outwardly relative to said temple portion so as to allow the long hair hanging down from the side of a wearer's head to fit between the temple and the arm.

4. The hair restraint of claim 3:

wherein the arm first angles rearwardly and outwardly relative to the temple and then angles inwardly relative to the outwardly angled portion.

5. The hair restraint of claim 3:

wherein the arm also angles upwardly relative to the temple.

6. The hair restraint of claim 3:

wherein the arm first angles rearwardly and outwardly relative to the temple and then angles inwardly relative to the outwardly angled portion, and wherein the arm also angles upwardly relative to the temple.

7. The hair restraint of claim 3:

wherein the mounting member is adjustable on the temple portion for movement of the mounting member and the arm lengthwise of the temple.

8. The hair restraint of claim 3:

wherein the arm is resiliently flexibly attached to the mounting member.

9. The hair restraint of claim 3:

wherein the mounting member is resiliently flexibly attached to the temple.

10. The hair restraint of claim 3:

wherein the arm is arcuate.

11. The hair restraint of claim 3:

wherein the the arm is fastened to the mounting member intermediate the front and rear ends of the mounting member.

12. The hair restraint of claim 3:

wherein the the arm is fastened to the front end of the mounting member.

13. The hair restraint of claim 3:

wherein the arm is fastened to the mounting member by a resiliently expandable annulus circumscribing the mounting member and adapted to circumscribe the temple.

14. The hair restraint of claim 13:

wherein the mounting member has an inwardly disposed barb that allows the annulus to be slipped onto the mounting member but precludes the annulus from sliding off from the mounting member unless it is expanded to do so.

15. The hair restraint of claim 3:

wherein the arm is pivoted to the mounting member.

16. The hair restraint of claim 3:

wherein the arm is slideably attached to the mounting member.

17. The hair restraint of claim 16:

wherein the arm is also pivoted to the mounting member.

18. Apparatus for restraining long hair hanging down from the sides of a person's head, comprising:

eyeframes adapted to fit over the eyes of the person;

a pair of temples extending rearwardly from the eyeframes adapted to fit against the head of the person between the person's head and the long hair that hangs downwardly from the sides of the head, each of temples having upper and lower edges, front and rear ends and inner and outer surfaces;

a pair of elongated mounting bars having inside surfaces disposed individually against the outer surfaces of the temples, outside surfaces, and front and rear end portions relatively adjacent to the front and rear ends of their respective temples;

resiliently expandable O-rings encircling the front and rear end portions of each mounting bar and its respective temple thereby releasably fastening the bars on the temples; and a pair of elongated relatively rigid arms individually connected to the outside surfaces of the mounting bars and divergently projecting rearwardly, upwardly and outwardly relative to their respective bars and temples thereby forming notches between the respectively adjacent temples and arms, each notch having a closed front end where its arm joins its temple and a wider open rear end having a transverse dimension capable of receiving all of the long hair that hangs downwardly on the sides of the person's head, the rear end of each arm being resiliently outwardly moveable away from its respective temple to allow entry of said long hair into its respective notch.

19. The apparatus of claim 18:

wherein the mounting bars are adjustable lengthwise of the temples.

20. the apparatus of claim 18:

wherein the arms are angulated with the included angle disposed toward the temples.

21. The apparatus of claim 18:

wherein the arms are arcuate with concave portions disposed toward their respective temples.

22. Apparatus for restraining long hair hanging down from the sides of a person's head, comprising:

eyeframes adapted to fit over the eyes of the person;

temples extending rearwardly from the eyeframes adapted to fit against the head of the person between the person's head and the long hair that hangs downwardly from the sides of the head, each of temples having upper and lower edges, front and rear ends and inner and outer surfaces; and elongated relatively rigid arms individually connected to and projecting outwardly from their respective temples, and forming notches between the respectively adjacent temples and arms, each notch having a closed front end and an open rear end capable of receiving the long hair that hangs downwardly on the sides of the person's head.

23. The apparatus of claim 22, wherein each arm is moveable outwardly away from its respective temple to allow entry of said long hair into its respective notch.

24. The apparatus of claim 23, wherein the arms are resiliently outwardly moveable.

25. The apparatus of claim 22, wherein the mounting arms are adjustable lengthwise of the temples.

26. The apparatus of claim 22 wherein the arms are angulated with the included angle disposed toward the temples.

27. The apparatus of claim 22, wherein the arms are arcuate with concave portions facing their respective temples.

28. The apparatus of claim 22, wherein the notches are disposed horizontal and generally V-shaped in plain view with the adjacent temples and arms forming the Vees.

\* \* \* \* \*